United States Patent
Wang et al.

(10) Patent No.: US 12,516,284 B2
(45) Date of Patent: Jan. 6, 2026

(54) SEPARATION METHOD AND ENRICHMENT CULTURE METHOD OF PSEUDOMONAS, AND REMEDIATION METHOD FOR CONTAMINATED SOIL

(71) Applicant: Qingdao University of Technology, Qingdao (CN)

(72) Inventors: Huawei Wang, Qingdao (CN); Xutong Jiang, Qingdao (CN); Yanru Zhang, Qingdao (CN); Jing Song, Qingdao (CN); Yanan Wang, Qingdao (CN); Yingjie Sun, Qingdao (CN); Shupeng Li, Qingdao (CN); Lewei Yang, Qingdao (CN); Yuanwen Liu, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 389 days.

(21) Appl. No.: 18/145,911

(22) Filed: Dec. 23, 2022

(65) Prior Publication Data
US 2024/0060036 A1 Feb. 22, 2024

(30) Foreign Application Priority Data
Aug. 16, 2022 (CN) .......................... 202210981338.4

(51) Int. Cl.
*C12N 1/20* (2006.01)
*B09C 1/10* (2006.01)
*C12R 1/38* (2006.01)

(52) U.S. Cl.
CPC ............... *C12N 1/205* (2021.05); *B09C 1/10* (2013.01); *B09C 2101/00* (2013.01); *C12R 2001/38* (2021.05)

(58) Field of Classification Search
CPC .............................. C12R 2001/38; C12N 1/20
See application file for complete search history.

(56) References Cited

U.S. PATENT DOCUMENTS 11,738,380 B2 * 8/2023 Wang ..................... C12P 3/00
435/168

FOREIGN PATENT DOCUMENTS

| CN | 108441456 A | | 8/2018 |
| CN | 112608869 A | | 4/2021 |
| CN | 114789193 A | * | 7/2022 |

OTHER PUBLICATIONS

Hou et al. Journal of Hazardous Materials, 396 (2020) 122631, pp. 1-9 (Year: 2020).*
Ning et al. Science of the Total Environment 825 (2022) 154057, pp. 1-11 (Year: 2022).*
Wang et al. Desalination and Water Treatment, 190 (2020) pp. 279-293 (Year: 2020).*

* cited by examiner

*Primary Examiner* — Louise W Humphrey
*Assistant Examiner* — Jessica Faye Edwards

(57) ABSTRACT

Disclosed are a separation method and enrichment culture method of *Pseudomonas*, and a remediation method for contaminated soils. The separation method of *Pseudomonas* includes: (S1) adding a water sample containing mixed microbiota to a nutrient broth medium containing 1.5-5% salinity followed by shaking and culturing to obtain a bacteria solution; and transferring the bacteria solution to a PYCM for further culturing; (S2) diluting the bacterial solution in a concentration gradient; (S3) equally dropwise adding each diluted bacterial solution onto an upper surface of a PYCM solid plate followed by culturing for 3 days to grow single colonies; and (S4) selecting a single colony with an inoculating ring to streak onto a PYCM solid plate to repeatedly undergo streak culturing several times to obtain a pure strain of *Pseudomonas* sp. strain KW-2.

4 Claims, 6 Drawing Sheets

SEPARATION METHOD AND ENRICHMENT CULTURE METHOD OF PSEUDOMONAS, AND REMEDIATION METHOD FOR CONTAMINATED SOIL

CROSS-REFERENCE TO RELATED APPLICATIONS

This application claims the benefit of priority from Chinese Patent Application No. 202210981338.4, filed on Aug. 16, 2022. The content of the aforementioned application, including any intervening amendments thereto, is incorporated herein by reference.

TECHNICAL FIELD

This application relates to soil remediation treatment, and more particularly to a separation method and enrichment culture method of *Pseudomonas*, and a remediation method for contaminated soil.

BACKGROUND

The information disclosed in background is merely intended for a better understanding of the general context of the present disclosure and should not be admitted or suggested in any way that this information is known to one of ordinary skill in the art.

Arsenic (As), as a highly toxic metalloid element, is widely distributed in nature and is known for its highly poisonous oxide, arsenic trioxide (white arsenic). As is highly biotoxic, teratogenic and mutagenic, posing a serious threat to human health and the growth of plants and animals. When consumed excessively, it can not only cause acute or chronic poisoning, but also induce skin, lung and bladder cancers. The International Agency for Research on Cancer (IARC) has identified arsenic as a human carcinogen and neurotoxin, which is required to be detected in national soil contamination risk control on agricultural land. Arsenic contamination in soil is abundant in source, mainly caused by anthropogenic activities, including uses of pesticide, applications of herbicide and phosphate fertilizer, development of the semiconductor industry, mining and smelting, manufacturing, coal burning, and wood preservatives. Arsenic contamination in soil is insidious, long-term, and irreversible. Once soil is contaminated by arsenic, it can be difficult and lengthy to treat. Natural sources of arsenic enter the ecosystem mainly through human activities, such as the use of chemical fertilizers and pesticides, and mining activities, all of which contribute to the accumulation of arsenic in groundwater and agricultural land. Furthermore, unlike most pollutants that end up in the ocean, arsenic undergoes a series of transformations and eventually gathers in the soil. The US Agency for Toxic Substances and Disease Registry classifies arsenic as a Class I hazardous substance, more dangerous than toxic metals (such as cadmium, lead, and mercury). Prolonged exposure to high levels of arsenic can seriously cause damage to human health. Arsenic compounds can be absorbed into the body through the respiratory, dermal and digestive tracts. Short-term exposure to arsenic can lead to acute arsenical poisoning, pulmonary edema, and cerebral edema. Long-term exposure to arsenic-contaminated substances or consumption of arsenic-contaminated crops can cause damage to the skin and liver, and pose neurological weakness and numbness in the limbs, which may induce genetic mutations and thus greatly increase the risk of cancer. Arsenic is found in soil mainly as inorganic compounds, most of which exist in the trivalent (As (III)) and pentavalent (As (V)) states. As (III) is 25-60 times more toxic than As (V) and has a better mobility. In recent years, the facts, including the large-scale mining of arsenic-containing ores, the widespread use of arsenic preparations in industrial and agricultural production, and the oxidation and leaching of many arsenic-containing waste rocks and tailings, lead to the decomposition, migration and diffusion of the arsenic element. As a result, arsenic contamination in soil occurs, posing a potential threat to the ecological environment and human health.

The main technologies available for the contaminated soil treatment include soil leaching, curing/stabilization, thermal treatment, phytoremediation and microbial remediation. The soil leaching method usually involves the addition of various leaching agents (such as organic or inorganic acids, bases, salts and chelating agents) to the soil. Besides destroying the original micro-agglomerate structure of the soil, the soil leaching method also leads to nutrient leaching and precipitation, thus bringing about groundwater contamination. Therefore, this method is only suitable for treating small-area contaminated soils. Thermal treatment of arsenic-contaminated soils also damages the soil structure and is high-cost for treatments and operations. The curing/stabilization technique is widely applied to the engineering treatment of arsenic-contaminated soils, such as cement encapsulation curing, chelating agent stabilization, inorganic materials (such as metal oxide) adsorption curing. However, this method involves the addition of agents of more than 5% per time, which is high-cost and prone to produce secondary pollution. The phytoremediation technology is low-cost, harmless to the original structure of the soil, and poses little change to the physical and chemical properties of the soil, but it also has low remediation efficiency and a long remediation cycle. The microbial remediation, as an emerging remediation technology, is identified as an effective soil remediation method, which is economical and free of secondary pollution and thus be studied by many researchers.

Compared to As (V), As (III) is more active, toxic and mobile, and has a greater adhesion ability and mobility. Therefore, the removal of As (III) is prioritized in the remediation of arsenic-contaminated soils.

Remediation techniques for arsenic contaminated soil include physical remediation, chemical remediation, and bioremediation, and mainly include curing/stabilization, soil leaching, microbial remediation and phytoremediation. The remediation technique is selected depending on the nature of the soil, the level of contamination, the end use, and the cost effectiveness. Conventional physical and chemical remediation techniques are usually high cost and prone to secondary contamination, and are thus not suitable for large-area arsenic-contaminated soil remediation. Although the curing/stabilization remediation technique has the advantages of fast, simple, low cost and low secondary contamination, its remediation effects and applications are still discounted. Moreover, this technology only changes the presence of heavy metals in the soil, and the heavy metals remain in the soil. Thus, the contaminated soil can hardly be restored to its original state, rendering it unsuitable for further use. As a result, the curing/stabilization remediation technique generally needs to be used in conjunction with other remediation techniques. The soil leaching remediation technology is flexible in operations, stable in effects, and thorough in remediation, and has short cycle time and high efficiency, but it tends to pose the leaching and precipitation of certain nutrients. Therefore, this technique is adapted for the treatment of small-area and heavily-contaminated soils. The phytoremediation technology is closer to natural ecology and has the advantages of low cost, short remediation cycle and no secondary pollution, and is suitable for large-area soil remediation. Unfortunately, this method has low efficiency for pollutant remediation and long cycle time. The microbial remediation method has weak damage to soil and low energy consumption, and is clean and efficient, which is a newly emerging technology for arsenic-contaminated soil remediation.

Meanwhile in China, since farmers lack recycling awareness, phthalate plasticizers are added when manufacturing the agricultural mulch film. Phthalates, namely, phthalate esters (PAEs), are important derivatives of phthalic acid, which are mainly used as plasticizers for plastic products in industry, accounting for 20-50% by weight of the plastic product. They are mainly applied to polyvinyl chloride (PVC) products, construction materials, adhesives, personal care products, medical devices, detergents, surfactants, children's toys, textiles, and household products. As the increasing production of plastics, the use amount of PAEs reaches approximately 1 million tons or more per year in Europe and China. As a result, the mass production and application of plastics have become major sources of PAEs in the environment today. When using the agricultural mulch film, phthalates tend to migrate into the soil to bring about the PAEs contamination in soil. In China, besides the extensive use of agricultural mulch film, the greenhouse films are also widely used, because the high demand for fresh vegetables (greenhouse vegetables) in winter. The greenhouse films are particularly common around developed cities. Although PAEs entering the soil through greenhouse films only accounts for ½ of agricultural mulch films, they still bring underestimated pollution. In addition, PAEs are carriers of pesticides and the raw material for the production of insect repellents, which can enter the soil by using the pesticides and insect repellents. Due to the slow degradation of PAEs in the environment and the continuous migration of PAEs caused by human agricultural activities, the content of PAEs is very high in soils in China. Currently, PAEs, as semi-volatile organic pollutants, have been highly abundant in soils in China. Moreover, PAEs are a class of estrogens that affect the formation and maturation of animal reproductive cells. The ingestion of PAEs by humans can disrupt the endocrine system, leading to endocrine disruption and high carcinogenicity. In particular, the effects on children are even greater than those on adults. Overexposure to PAEs can harm children's liver and kidneys, and has an impact on children's behavior and intelligence.

In recent years, it has been found that PAEs can affect the endocrine system in humans and animals, and are mutagenic, carcinogenic and teratogenic. The US National Environmental Protection Agency has listed six PAEs, i.e., dimethyl phthalate (DMP), diethyl phthalate (DEP), dioctyl phthalate (DOP), dibutyl phthalate (DBP), butyl benzyl phthalate (BBP), and di(2-ethylhexyl) phthalate (DEHP), as prior-controlling organic pollutants. In China, PAEs have been identified as one class of the most volatile organic pollutants. In the early 20th century, plastic films are gradually used in agricultural production to improve the environment of greenhouses, thus enabling crop production in a whole year. The extensive use of agricultural mulch films is considered to be a major source of PAEs in the soil. Although the development and widespread use of agricultural films has greatly increased crop yields, they bring PAEs contamination of the soil, seriously threatening the safety of our agricultural products and the health of ecological environment in China. The off-site pollution sources, such as agricultural mulch, sewage irrigation, fertilizers, and pesticides, render the presence of PAEs in soils. Among them, the agricultural mulch is the main source of PAEs in soils. Research shows that PAEs, as the main component of agricultural mulch, account for 10-60% by mass of the agricultural mulch. The presence of PAEs has been detected in the facility agriculture soils in China. Furthermore, PAEs can enter the hydrosphere through agricultural irrigation and surface runoff, and can enter the atmosphere and biosphere through volatilization, leaching, and plant up taking, posing a threat to the ecosystem.

The current technologies for the remediation of PAEs in soil mainly include physicochemical, bioremediation, and photocatalytic technologies. However, these remediation techniques are difficult to be applied on a large scale in soil remediation because they have high costs, technical difficulties and secondary soil contamination. Compared to physical and chemical remediation, bioremediation is low-cost, effective, and environmentally friendly. Microbial remediation for PAEs-contaminated soil utilizes functional microorganisms, which naturally occur or are categorically selected, to promote microbial metabolic functions under artificially optimized conditions, thereby reducing or degrading PAEs into non-toxic substances. The microbial remediation is one of the earliest, most numerous and most intensive remediation methods for PAEs-contaminated soil remediation, which is particularly suitable for the remediation of large areas of contaminated agricultural soils, and has long-term positive significance for the sustainable use of agricultural soils. Therefore, it is a key issue to develop an economically safe, green, and efficient in-situ remediation technique for PAEs-contaminated soils.

SUMMARY

An object of the present disclosure is to provide an in-situ remediation method for arsenic-contaminated soil, arsenic phthalate-contaminated soil, and phthalate compound-contaminated soil by bacteria, specifically a separation method and enrichment culture method of *Pseudomonas*, and a remediation method for contaminated soil, to overcome the deficiencies in the prior art.

Technical solutions of this application are described as follows.

In a first aspect, this application provides a separation method of *Pseudomonas*, comprising;

(S1) adding a water sample containing mixed microbiota to a nutrient broth medium containing 1.5-5% salinity followed by shaking and culturing to obtain a bacteria solution; and transferring the bacteria solution to a peptone yeast citrate medium (PYCM) for further culturing;

(S2) diluting the bacterial solution in a concentration gradient of $10^{-1}$, $10^{-2}$, $10^{-3}$, $10^{-4}$, $10^{-5}$, $10^{-6}$, $10^{-7}$, and $10^{-8}$, respectively;

(S3) preparing a first PYCM solid plate containing 1.5-5% salinity; and equally dropwise adding each diluted bacterial solution onto an upper surface of the first PYCM solid plate followed by uniform coating; and placing the first PYCM solid plate in an incubator for culturing at 30° C. for 3 days to grow single colonies; and (S4) preparing a second PYCM solid plate containing 1.5-5% salinity; and selecting a single colony with an inoculating ring to streak onto the second PYCM solid plate to repeatedly undergo streak culturing several times to obtain a pure strain of *Pseudomonas* sp. strain KW-2.

The *Pseudomonas* sp. strain KW-2 has been deposited at the China General Microbiological Culture Collection Center (CGMCC) (NO.1 West Beichen Road, Chaoyang District, Beijing 100101, China) on Nov. 15, 2023, with an accession number of CGMCC 29017.

In some embodiments, step (S1) further comprises:

incubating a rusty water sample with the mixed microbiota into a nutrient broth medium containing 3.5% NaCl with an inoculation ratio of 2% followed by enrichment and culturing at 30° C. and 150 r·min$^{-1}$ for 3 days to obtain the bacteria solution; and inoculating the bacteria solution into a PYCM containing 3.5% NaCl at an inoculation ratio of 2% followed by culturing for 3 days.

In some embodiments, in step (S1), the PYCM comprises 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate; and the PYCM has a pH of 7.0±0.2, and is sterilized.

In some embodiments, in step (S1), the nutrient broth medium is 0.1 g/L nutrient broth; and the nutrient broth medium has a pH of 7.0±0.2 and is sterilized.

In some embodiments, both the first PYCM solid plate in step (S3) and the second PYCM solid plate in step (S4) are prepared through step of:

subjecting a PYCM containing 1.5-5% salinity to sterilization, cooling to 60±5° C. for inversion, solidify, and cooling to room temperature; and the uniform coating in step (S3) is performed through steps of:

spreading the bacterial solution back and forth on the first PYCM solid plate with an applicator for 30 s to allow uniform distribution of the bacterial solution.

In some embodiments, in step (S4), step "selecting a single colony with an inoculating ring to streak onto the second PYCM solid plate to repeatedly perform streak culture several times" comprises:

successively selecting a single colony to undergo streak culture 3 times, with 3 days as one cycle.

In a second aspect, this application provides an enrichment culture method of *Pseudomonas*, comprising:

inoculating the pure strain of *Pseudomonas* sp. strain KW-2 obtained by using the aforementioned separation method into an enrichment nutrient broth medium for enrichment culture to form a remediation stock solution;

wherein the enrichment nutrient broth medium is 19 g/L nutrient broth; and the enrichment nutrient broth medium has a pH of 7.0±0.2 and is sterilized In a third aspect, this application provides a remediation method for contaminated soil, comprising:

obtaining a remediation stock solution formed by using the aforementioned enrichment culture method of *Pseudomonas*;

centrifuging and separating the remediation stock solution to collect *Pseudomonas* cells; and suspending the *Pseudomonas* cells to a PYCM, followed by turning over and shaking to form a remediation bacteria mixture; and feeding the remediation bacteria mixture to the contaminated soil, followed by mixing and culturing at 30° C. for 15 days.

In some embodiments, a feeding amount of the remediation bacteria mixture is 20% by weight of the contaminated soil;

the PYCM comprises 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate; and the PYCM has a pH of 7.0±0.2 and is sterilized; and an initial pH of the contaminated soil is 8.5-9; and pH change in the contaminated soil is detected every 24 hours during remediation.

In some embodiments, the contaminated soil comprises at least one of arsenic and phthalate contaminated soil, arsenic-contaminated soil or phthalate contaminated soil.

The remediation method provided herein is applied to arsenic-PAE-contaminated soil, arsenic-contaminated soil, or PAE-contaminated soil. The bacterial solution is added to the contaminated soil so that the bacteria induce the production of biogenic manganese oxides, which undergo a series of physical-chemical-biochemical reactions with trivalent arsenic, pentavalent arsenic, and phthalate in the soil to complete the simultaneous in-situ remediation of arsenic and/or PAEs in the soil.

The remediation method for PAE-contaminated soil provided herein had the following the beneficial effects.

(1) Bacteria were not required to be loaded onto a carrier. The whole method was simple to operate and highly adjustable. Mn (II) was brought into the contaminated soil in the form of manganese (IV) oxide through the action of the strain, resulting in increased degradation of PAEs in soil.

(2) The remediation method provided herein is simple in process, timeless, easy to operation, low-cost, large-range in treatment, and free of secondary pollution.

DETAILED DESCRIPTION OF EMBODIMENTS

Figure 1:
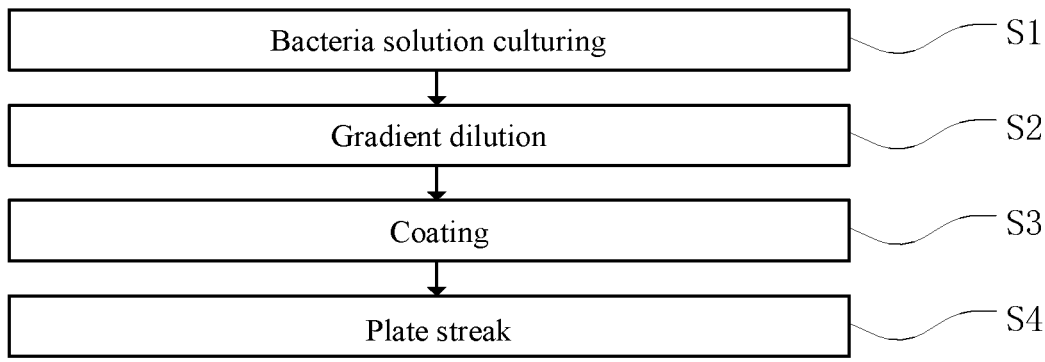
FIG. 1 is a flow chart of a separation method of *Pseudomonas* sp according to an embodiment of the present disclosure.

The technical solutions in the embodiments of the present disclosure will be clearly and completely described below with reference to the embodiments of the present disclosure. It is clear that the embodiments described are only a part of the embodiments of the present disclosure. Based on the embodiments in the present disclosure, all other embodiments obtained by one of ordinary skill in the art without paying any creative work shall fall within the scope of protection of the present disclosure.

In a first aspect, microbial remediation for arsenic-contaminated soil is achieved by changing the biological effectiveness of arsenic through biochemical reactions of microorganisms to arsenic (As), such as redox, adsorption, methylation, and precipitation. The presence of Mn(II) or Mn(III) in the lattice structure of manganese oxides and lattice defects in octahedral interlayer and mineral of manganese oxides, rendering the manganese oxides to carry lots of negative charges, which need to be compensated by cations, such as $H^+$, $Na^+$, $K^+$, Mn(II), Ca(II), and water molecules ($H_3O^+$). In this case, manganese oxides have a high cation exchange capacity and enable them to adsorb a large number of metal ions. The adsorption of metal ions by manganese oxides always includes three ways: external surface adsorption, referring to adsorption on the surface of the layer or the edge of the $MnO_6$ octahedron; internal surface adsorption, referring to adsorption on the upper (lower) side of the interlayer manganese oxide octahedron or into the internal structure of the tunneled manganese oxide; and adsorption by replacing Mn in the structure of the manganese oxide or by entering the structural cavities of the manganese oxide.

Biogenic manganese oxide (BMO), with high valence state and many octahedral cavities in structure, has a larger specific surface area, rendering a stronger adsorption and oxidation capacity for arsenic. Studies have shown the reaction processes between BMO and As: As (III) is first adsorbed onto the surface of the manganese oxide and then oxidized by the $MnO_2$ therein to produce As (V); and accompanied by the release of $Mn^{2+}$, the As (V) is desorbed from the surface of the manganese oxide and then adsorbed onto the surface of the adsorbent to be removed, thus achieving the in-situ remediation of As pollution.

In a second aspect, the degradation of phthalate esters (PAEs) in the environment occurs mainly through the metabolism of aerobic and anaerobic bacteria. The microbial degradation of PAEs mainly includes (1) side chain degradation of PAEs to produce intermediate metabolites, such as phthalic acid (PA) and protocatechin acid (PCA); and (2) complete mineralization of intermediate metabolites. The side-chain degradation of PAEs includes β-oxidation, transesterification, and de-esterification. The β-oxidation mainly acts with regard to PAEs that have a number of carbon atoms on the side chain of the ester group greater than 2. The transesterification occurs in the unilateral ester group of PAEs. The metabolic pathway of PAEs by de-esterification is studied thoroughly, which includes the following steps. The ester groups on one or both sides of PAEs are subjected to hydrolysis to produce an acidic intermediate metabolite of PA containing a benzene ring. Under aerobic conditions, Gram-negative bacteria oxidize PA to cis-4,5-dihydroxy-4,5-dihydrophthalic acid by phthalic acid 4,5-dioxygenase, which is then converted to PCA by dehydrogenation and decarboxylation. Gram-positive bacteria oxidize PA to 3,4-dihydroxyphthalic acid by phthalic acid 3,4-dioxygenase, which is also converted to PCA after a series of metabolisms. PCA is catalyzed by enzymes to undergo ring opening to form the corresponding organic acid. The corresponding organic acid is then converted into small molecule organic acids (such as oxaloacetic acid, succinic acid, and pyruvic acid) to enter the tricarboxylic acid cycle and eventually be mineralized into $CO_2$ and $H_2O$. Under anaerobic conditions, PA is converted into benzoic acid by the action of the relevant decarboxylase enzymes and then mineralized into $CO_2$ and $H_2O$ through a series of processes, such as dehydrogenation and oxidation.

In the whole degradation process of PAEs, BMO mainly acts for oxidation, and oxaloacetic acid and pyruvic acid generated in the degradation process can also be used as carbon sources for manganese-oxidizing bacteria through tricarboxylic acid circulation. The whole degradation process is completed by combination of manganese-oxidizing bacteria and other bacteria. The manganese-oxidizing bacteria provide strong oxidizing biogenic manganese oxides, which accelerates the degradation of PAEs. Compared with the physical degradation and the chemical degradation, the microbial degradation is efficient, low-cost, free of secondary pollution, and adaptive to various environments. Therefore, the microbial degradation is recognized to be one of most promising environmental remediation technologies. The original form of manganese oxide formed by biology (biogenic manganese oxide, BMO) is layered manganese ore, similar to hexagonal birnessite. The BMO is weak in crystallization and small in particle size, and has a plurality of octahedral holes and interlayer manganese atoms, so that it has stronger adsorption and oxidation capacity than the chemical manganese oxide. Due to its stable chemical property, high specific surface area, and good adsorption and oxidation performance, BMO has important influence on migration and conversion of heavy metals and organic matters in the environment. Thus, BMO has important environmental significance.

In a third aspect, the degradation process of PAEs by bacteria is generally divided into initial hydrolysis and final degradation. In the initial hydrolysis, the length of the side chain of bacteria is reduced by oxidation, transesterification and de-esterification, followed by hydrolysis to obtain the phthalic acid (PA). The final degradation refers the degradation of PA. PA is easily oxidized into 4,5-dihydroxyphthalic acid, and converted into protocatechuic acid through decarboxylation. The ring-opening of the protocatechuic acid can form two organic acids. Under the action of biological enzymes, organic acids can be broken to generate oxaloacetic acid and pyruvic acid, which are degraded into water and carbon dioxide through the respiratory action of microorganisms. In the whole degradation process of PAEs, BMO mainly plays a role in oxidation, and oxaloacetic acid and pyruvic acid generated in the degradation process can also be used as carbon sources for manganese-oxidizing bacteria through tricarboxylic acid circulation. The whole degradation process is completed by combination of manganese-oxidizing bacteria and other bacteria. The manganese-oxidizing bacteria provide strong oxidizing biogenic manganese oxides, which accelerates the degradation of PAEs.

The original form of BMO is layered manganese ore, which has small size and high manganese valence state, so that it has stronger oxidation capacity than the chemical manganese oxide. In addition, BMO also has a strong adsorption capacity. To be specific, the initially generated BMO has electronegativity and thus can attract positively charged heavy metal cations. BMO has an octahedral structure and large specific surface area, and thus shows a strong capacity in surface complex adsorption. BMO has a high surface activity and has the capacity of ion exchange and coprecipitation. Moreover, the chemical property of BMO is stable, which is not easy to decompose and can exist for a long time. Therefore, BMO can be used as a desired remediation material for arsenic-and-phthalate-contaminated soil.

Therefore, this application provides an in-situ remediation method of arsenic-contaminated soil, PEA and arsenic-contaminated soil, and PEA composite contaminated soil by bacteria, in particular to a separation method and enrichment culture method of *Pseudomonas*, and a remediation method for contaminated soil. Under the action of the metabolite of bacteria, the exchangeable-state arsenic in the soil can be converted into the residue-state arsenic to reduce the mobility and the biological effectiveness of the arsenic in the soil and effectively fix the arsenic in the soil. Meanwhile, BMOs can effectively degrade PEAs.

As shown in FIG. 1, this application, in a first aspect, provides a separation method of *Pseudomonas* sp, which includes the following steps.

(S1) Culturing

A water sample containing mixed microbiota is added to a nutrient broth medium containing 1.5-5% salinity followed by shaking and culturing to obtain a bacteria solution. The bacteria solution is then transferred to a peptone yeast citrate medium (PYCM) for further culturing.

(S2) Gradient Dilution

The bacterial solution is diluted in a concentration gradient of $10^{-1}$, $10^{-2}$, $10^{-3}$, $10^{-4}$, $10^{-5}$, $10^{-6}$, $10^{-7}$, and $10^{-8}$, respectively.

(S3) Coating

A first PYCM solid plate containing 1.5-5% salinity. Each diluted bacterial solution is equally dropwise added onto an upper surface of the first PYCM solid plate followed by uniform coating. The first PYCM solid plate is placed in an incubator for culturing at 30° C. for 3 days to grow single colonies.

(S4) Plate Streak

A second PYCM solid plate containing 1.5-5% salinity is prepared. A single colony is selected with an inoculating ring to streak onto the second PYCM solid plate to repeatedly undergo streak culture several times to obtain a pure strain of *Pseudomonas* sp. strain KW-2.

In some embodiments, step (S1) further includes the following step. A rusty water sample with the mixed microbiota is incubated into a nutrient broth medium containing 3.5% NaCl with an inoculation ratio of 2% followed by enrichment and culturing at 30° C. and 150 r·min$^{-1}$ for 3 days to obtain the bacteria solution. The bacteria solution is inoculated into a PYCM containing 3.5% NaCl at an inoculation ratio of 2% followed by culturing for 3 days.

In some embodiments, in step (S1), the PYCM includes 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate; and the PYCM has a pH of 7.0±0.2, and is sterilized.

In some embodiments, in step (S1), the nutrient broth medium is 0.1 g/L nutrient broth; and the nutrient broth medium has a pH of 7.0±0.2 and is sterilized.

In some embodiments, both the first PYCM solid plate in step (S3) and the second PYCM solid plate in step (S4) are prepared through the following steps: the PYCM containing 1.5-5% salinity is subjected to sterilization, cooling to 60±5° C. for inversion, solidify, and cooling to room temperature. The coating in step (S3) is performed through the following steps: the bacterial solution is coated back and forth on the first PYCM solid plate with an applicator for 30 s to allow uniform distribution of the bacterial solution.

In some embodiments, in step (S4), the step "A single colony is selected with an inoculating ring to streak onto the second PYCM solid plate to repeatedly undergo streak culture several times" includes the following steps: a single colony is selected to undergo streak culture 3 times, with 3 days as one cycle.

In a second aspect, this application provides an enrichment culture method of *Pseudomonas*, which includes the following steps.

The pure strain of *Pseudomonas* sp. strain KW-2 obtained by using the aforementioned separation method is inoculated into an enrichment nutrient broth medium for enrichment culture to form a remediation stock solution. In this method, the enrichment nutrient broth medium is 19 g/L nutrient broth; and the enrichment nutrient broth medium has a pH of 7.0±0.2 and is sterilized.

In a third aspect, this application provides a remediation method for contaminated soil, which includes the following steps.

Preparation of a Remediation Stock Solution

A remediation stock solution formed by using the aforementioned enrichment culture method of *Pseudomonas* is obtained.

Preparation of a Remediation Bacteria Mixture

The remediation stock solution is centrifuged and separated. Then the supernatant and a $Mn^{2+}$ solution are added to a PYCM, followed by turning over and shaking to form a remediation bacteria mixture.

Soil Remediation

The remediation bacteria mixture is fed to the contaminated soil, followed by mixing and culturing at 30° C. for 15 days.

In some embodiments, a feeding amount of the remediation bacteria mixture is 20% by weight of the contaminated soil; a mass fraction of $Mn^{2+}$ ions in the $Mn^{2+}$ solution is 100 mg/kg; the PYCM includes 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate; and the PYCM has a pH of 7.0±0.2 and is sterilized; and an initial pH of the contaminated soil is 8.5-9; and pH change in the contaminated soil is detected every 24 hours during remediation, with a gradual increase in pH and pH≤9.5.

In some embodiments, the contaminated soil comprises at least one of arsenic and phthalate contaminated soil, arsenic-contaminated soil, or phthalate-contaminated soil.

The aforementioned remediation method is used for arsenic and phthalate contaminated soil, arsenic-contaminated soil, or phthalate-contaminated soil. Specifically, the bacteria solution is added to the contaminated soil to induce the bacteria to generate biogenic manganese oxides. Then the biogenic manganese oxides react with trivalent arsenic, pentavalent arsenic, and phthalate in the contaminated soil, including a series of physical-chemical-biochemical reactions, to complete synchronous in-situ remediation of the arsenic and/or the phthalate in the contaminated soil.

Specific embodiments are listed below to describe the specific application of the present disclosure in detail.

Example 1

Figure 2:
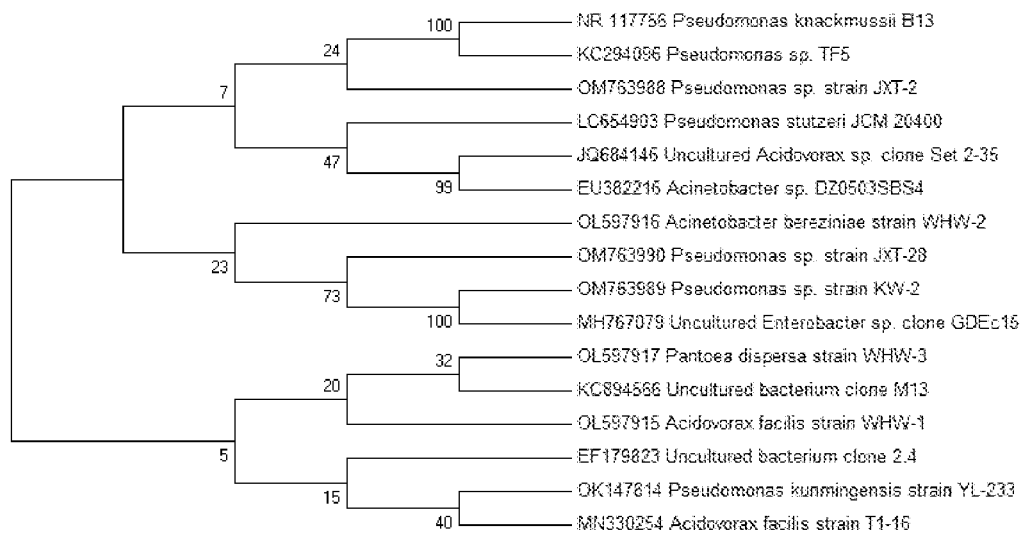
FIG. 2 is genealogical development tree of the *Pseudomonas* sp according to an embodiment of the present disclosure.

(1) Provided herein was a separation method of *Pseudomonas* sp, which includes the following steps.
Strain Domestication and Separation A rusty water sample with mixed microbiota was incubated into a nutrient broth medium containing 3.5% NaCl with an inoculation ratio of 2%, followed by enrichment and culturing at 30° C. and 150 r·min$^{-1}$ for 3 days to obtain a bacteria solution. The bacteria solution was then inoculated into a PYCM containing 3.5% NaCl at an inoculation ratio of 2%, followed by culturing for 3 days.
Gradient Dilution The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.
Coating The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.
Plate Streak A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.
Enrichment Culture The pure strain of *Pseudomonas* sp. strain KW-2 was inoculated into an enrichment nutrient broth medium (19 g/L) for enrichment culture to form a remediation stock solution.

The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized. The nutrient broth medium was 0.1 g/L nutrient broth, which had a pH of 7.0±0.2 and was sterilized.

(2) Provided herein was a remediation method for arsenic-contaminated soil, which includes the following steps.

A test substance was fed to contaminated soil, followed by mixing for 30 min and culturing at 30° C. for 3 days, where a feeding amount of the test substance was 20% by weight of the contaminated soil. The bacteria solution was added to the contaminated soil to induce the bacteria to generate biogenic manganese oxides. As (III) was first adsorbed onto the surface of the manganese oxide and then oxidized by the $MnO_2$ therein to be converted as As (V). Along with the release of $Mn^{2+}$, the As (V) was desorbed from the surface of the manganese oxide and then adsorbed onto the surface of the adsorbent to be removed, during which a series of physical-chemical-biochemical reactions occur between the biogenic manganese oxide and the As (III) and As (V) in the arsenic-contaminated soil to complete the in-situ remediation of the arsenic-contaminated soil.

Figure 3:
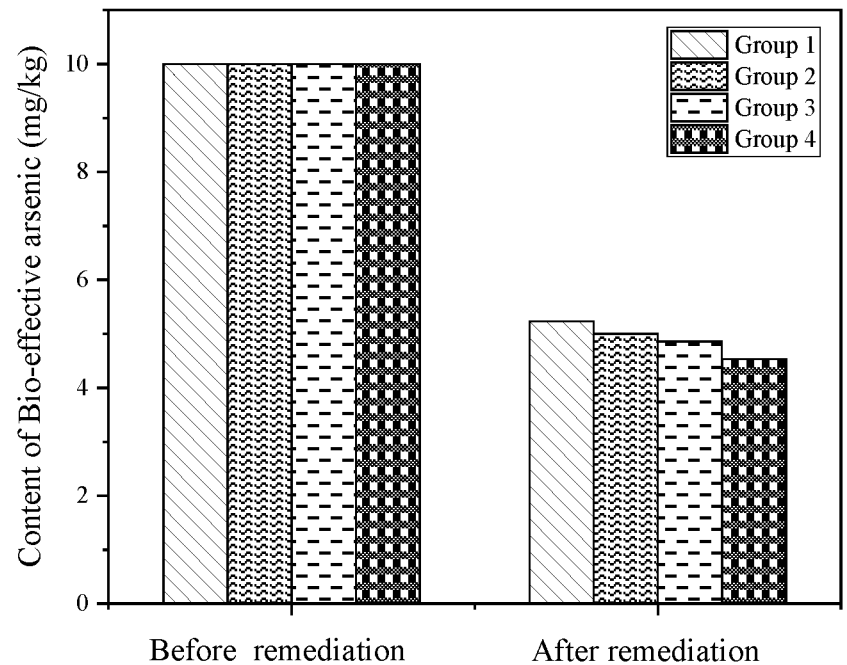
FIG. 3 schematically shows the change in content the bio-effective arsenic in the arsenic-contaminated soil after 3 days of remediation according to Example 1 of the present disclosure.

As shown in FIG. 3, the amount of bio-effective As in the soil decreased. Particularly, the amount of bio-effective As in the bacteria-treated group was less than that in the untreated group, decreasing from 10 mg/kg to 4.53 mg/kg after treatment for three days.

Example 2

(1) Provided herein was a separation method of *Pseudomonas* sp, which includes the following steps.
Strain Domestication and Separation A rusty water sample with mixed microbiota was incubated into a nutrient broth medium containing 3.5% NaCl with an inoculation ratio of 2%, followed by enrichment and culturing at 30° C. and 150 r·min$^{-1}$ for 3 days to obtain a bacteria solution. The bacteria solution was then inoculated into a PYCM containing 3.5% NaCl at an inoculation ratio of 2%, followed by culturing for 3 days.
Gradient Dilution The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.
Coating The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.
Plate Streak A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.
Enrichment Culture The pure strain of *Pseudomonas* sp. strain KW-2 was inoculated into an enrichment nutrient broth medium (19 g/L) for enrichment culture to form a remediation stock solution.

The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized. The nutrient broth medium was 0.1 g/L nutrient broth, which had a pH of 7.0±0.2 and was sterilized.

(2) Provided herein was a remediation method for arsenic-contaminated soil, which includes the following steps.

A test substance was fed to contaminated soil, followed by mixing for 5-30 min and culturing at 15-35° C. for 7 days, where a feeding amount of the test substance was 20% by weight of the contaminated soil. The bacteria solution was added to the contaminated soil to induce the bacteria to generate biogenic manganese oxides. As (III) was first adsorbed onto the surface of the manganese oxide and then oxidized by the $MnO_2$ therein to be converted as As (V).

Along with the release of $Mn^{2+}$, the As (V) was desorbed from the surface of the manganese oxide and then adsorbed onto the surface of the adsorbent to be removed, during which a series of physical-chemical-biochemical reactions occur between the biogenic manganese oxide and the As (III) and As (V) in the arsenic-contaminated soil to complete the in-situ remediation of the arsenic-contaminated soil.

Figure 4:
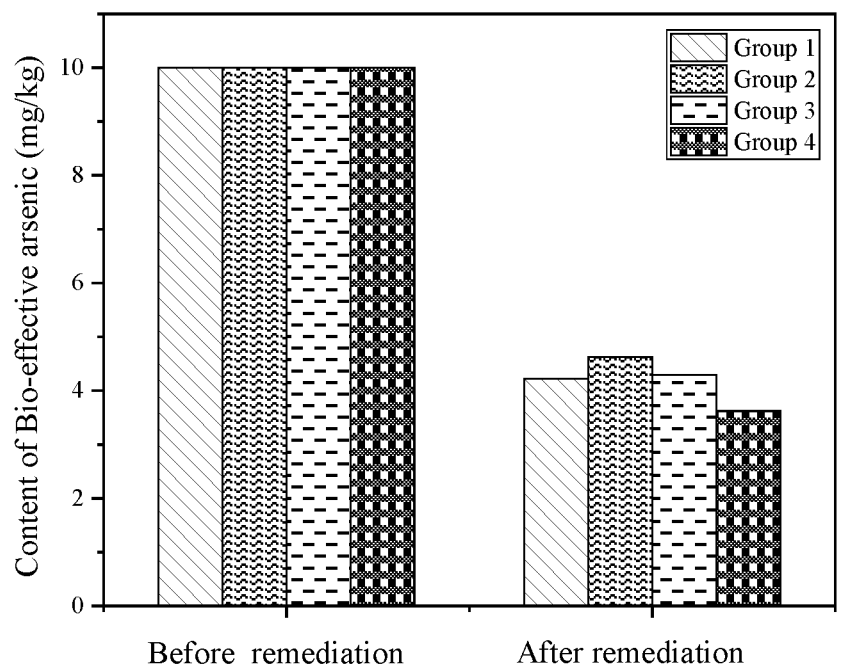
FIG. 4 schematically shows the change in content the bio-effective arsenic in the arsenic-contaminated soil after 7 days of remediation according to Example 2 of the present disclosure.

As shown in FIG. 4, the amount of bio-effective As in the soil decreased. Particularly, the amount of bio-effective As in the bacteria-treated group was less than that in the untreated group, decreasing from 10 mg/kg to 3.62 mg/kg after treatment for 7 days.

Example 3

(1) Provided herein was a separation method of *Pseudomonas* sp, which includes the following steps.
Strain Domestication and Separation A rusty water sample with mixed microbiota was incubated into a nutrient broth medium containing 3.5% NaCl with an inoculation ratio of 2%, followed by enrichment and culturing at 30° C. and 150 r·$min^{-1}$ for 3 days to obtain a bacteria solution. The bacteria solution was then inoculated into a PYCM containing 3.5% NaCl at an inoculation ratio of 2%, followed by culturing for 3 days.
Gradient Dilution The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.
Coating The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.
Plate Streak A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.
Enrichment Culture The pure strain of *Pseudomonas* sp. strain KW-2 was inoculated into an enrichment nutrient broth medium (19 g/L) for enrichment culture to form a remediation stock solution.

The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized. The nutrient broth medium was 0.1 g/L nutrient broth, which had a pH of 7.0±0.2 and was sterilized.

(2) Provided herein was a remediation method for arsenic-contaminated soil, which includes the following steps.

A test substance was fed to contaminated soil, followed by mixing for 30 min and culturing at 30° C. for 15 days, where a feeding amount of the test substance was 20% by weight of the contaminated soil. The bacteria solution was added to the contaminated soil to induce the bacteria to generate biogenic manganese oxides. As (III) was first adsorbed onto the surface of the manganese oxide and then oxidized by the $MnO_2$ therein to be converted as As (V). Along with the release of $Mn^{2+}$, the As (V) was desorbed from the surface of the manganese oxide and then adsorbed onto the surface of the adsorbent to be removed, during which a series of physical-chemical-biochemical reactions occur between the biogenic manganese oxide and the As (III) and As (V) in the arsenic-contaminated soil to complete the in-situ remediation of the arsenic-contaminated soil.

Figure 5:
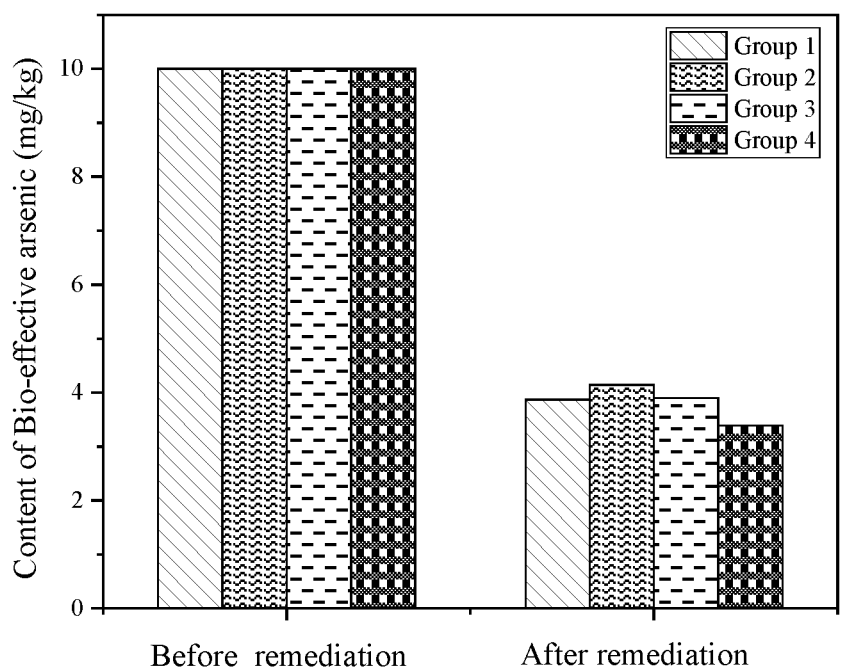
FIG. 5 schematically shows the change in content the bio-effective arsenic in the arsenic-contaminated soil after 15 days of remediation according to Example 3 of the present disclosure.

As shown in FIG. 5, the amount of bio-effective As in the soil decreased. Particularly, the amount of bio-effective As in the bacteria-treated group was less than that in the untreated group, decreasing from 10 mg/kg to 3.39 mg/kg after treatment for 15 days.

As could be seen from the above embodiments, by using the remediation method provided in the present disclosure, the arsenic-contaminated soil could be remediated. In the remediation method, *Pseudomonas* sp. strain KW-2 was selected and subjected to enrichment culture in an enrichment medium. Then the Mn (II) was brought into the contaminated soil in the form of manganese (IV) oxide through the action of the strain, which converted the exchangeable-state arsenic into the residual-state arsenic, reducing the migratory and biological effectiveness of arsenic in the soil, and effectively enhancing the arsenic-remediation effect. In general, the remediation method provided herein had the advantages of simple process, short remediation time, easy operation, low treatment cost, large treatment range, and no secondary pollution.

The test substance dosage in Examples 1-3 was shown in Table 1.

TABLE 1

Test substance dosage in Examples 1-3

|  | Group 1 | Group 2 | Group 3 | Group 4 |
| --- | --- | --- | --- | --- |
| Contaminated soil (g) | 450 | 450 | 450 | 450 |
| Test substance | 10-30% Deionized Water | 10-30% PYCM (without Mn) | 10-30% $Mn^{2+}$ solution (100 mg/kg) | Bacteria, PYCM, and $Mn^{2+}$ solution |

10-30% of the well-cultured bacteria mixture 1 was taken out to undergo centrifugation to collect *Pseudomonas* cells. The *Pseudomonas* cells and 100 mg/kg $Mn^{2+}$ solution were added to the PYCM (without Mn), followed by turning over and shaking to form the bacteria mixture 1.

The test substance was added to the arsenic-contaminated soil according to the ratios in Table 1, stirred and mixed for 20-40 minutes, and then cultured at room temperature (15-35° C.) for 15 days. The bacteria solution was added to the contaminated soil to induce the bacteria to generate biogenic manganese oxides. As (III) was first adsorbed onto the surface of the manganese oxide and then oxidized by the $MnO_2$ therein to be converted as As (V). Along with the release of $Mn^{2+}$, the As (V) was desorbed from the surface of the manganese oxide and then adsorbed onto the surface of the adsorbent to be removed, during which a series of physical-chemical-biochemical reactions occur between the biogenic manganese oxide and the As (III) and As (V) in the arsenic-contaminated soil to complete the in-situ remediation of the arsenic-contaminated soil.

The remediation method for arsenic-contaminated soil provided herein had the following the beneficial effects.

(1) Bacteria induced the production of manganese oxides in the soil, which could effectively fix the arsenic in the soil and convert the exchangeable-state arsenic into the residual-state arsenic, reducing the migratory and biological effectiveness of arsenic in the soil, thus achieving the in-situ remediation of the arsenic-contaminated soil.

(2) The method was simple, easy to operate, low-cost, large-range in treatment, and free of secondary pollution.

Example 4

(1) Provided herein was a separation method of *Pseudomonas* sp, which includes the following steps.
Strain Domestication and Separation
A rusty water sample with mixed microbiota was incubated into a nutrient broth medium containing 3.5% NaCl with an inoculation ratio of 2%, followed by enrichment and culturing at 30° C. and 150 r·min$^{-1}$ for 3 days to obtain a bacteria solution. The bacteria solution was then inoculated into a PYCM containing 3.5% NaCl at an inoculation ratio of 2%, followed by culturing for 3 days.
Gradient Dilution
The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.
Coating
The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.
Plate Streak
A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.
Enrichment Culture
The pure strain of *Pseudomonas* sp. strain KW-2 was inoculated into an enrichment nutrient broth medium (19 g/L) for enrichment culture to form a remediation stock solution.
The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized. The nutrient broth medium was 0.1 g/L nutrient broth, which had a pH of 7.0±0.2 and was sterilized.

(2) Provided herein was a remediation method for PAE-contaminated soil, which includes the following steps.
A test substance was fed to PAE-contaminated soil, followed by mixing for 30 min and culturing at 30° C. for 3 days, where a feeding amount of the test substance was 20% by weight of the contaminated soil. The bacteria solution was added to the PEA-contaminated soil to induce the bacteria to generate biogenic manganese oxides (BMOs). BMOs converted PEA into $CO_2$ and $H_2O$ through a series of metabolic pathways, thus achieving the in-situ remediation of PAE-contaminated soil.

Figure 6:
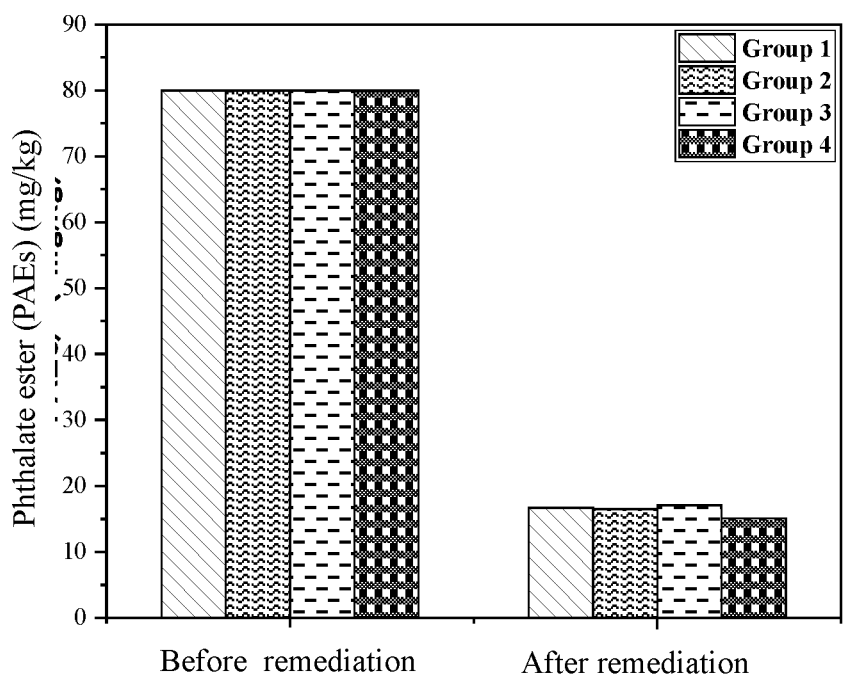
FIG. 6 schematically shows the change in content of phthalate ester (PAE) in the PAE-contaminated soil after 3 days of remediation according to Example 4 of the present disclosure.

As shown in FIG. 6, the content of PAE in the soil added with manganese-oxidizing bacteria was lower than the soil without adding manganese-oxidizing bacteria. In the presence of sufficient nutrients and inorganic salts, the growth and reproduction of microorganisms could effectively degrade PAE in the soil, decreasing from 80 mg/kg to 15.06 mg/kg after treatment for 3 days.

Example 5

(1) Provided herein was a separation method of *Pseudomonas* sp, which includes the following steps.
Strain Domestication and Separation
A rusty water sample with mixed microbiota was incubated into a nutrient broth medium containing 3.5% NaCl with an inoculation ratio of 2%, followed by enrichment and culturing at 30° C. and 150 r·min$^{-1}$ for 3 days to obtain a bacteria solution. The bacteria solution was then inoculated into a PYCM containing 3.5% NaCl at an inoculation ratio of 2%, followed by culturing for 3 days.
Gradient Dilution
The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.
Coating
The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.
Plate Streak
A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.
Enrichment Culture
The pure strain of *Pseudomonas* sp. strain KW-2 was inoculated into an enrichment nutrient broth medium (19 g/L) for enrichment culture to form a remediation stock solution.
The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized. The nutrient broth medium was 0.1 g/L nutrient broth, which had a pH of 7.0±0.2 and was sterilized.

(2) Provided herein was a remediation method for PAE-contaminated soil, which includes the following steps.
A test substance was fed to PAE-contaminated soil, followed by mixing for 30 min and culturing at 30° C. for 7 days, where a feeding amount of the test substance was 20% by weight of the contaminated soil. The bacteria solution was added to the PAE-contaminated soil to induce the bacteria to generate biogenic manganese oxides (BMOs). BMOs converted PEA into $CO_2$ and $H_2O$ through a series of metabolic pathways, thus achieving the in-situ remediation of PAE-contaminated soil.

Figure 7:
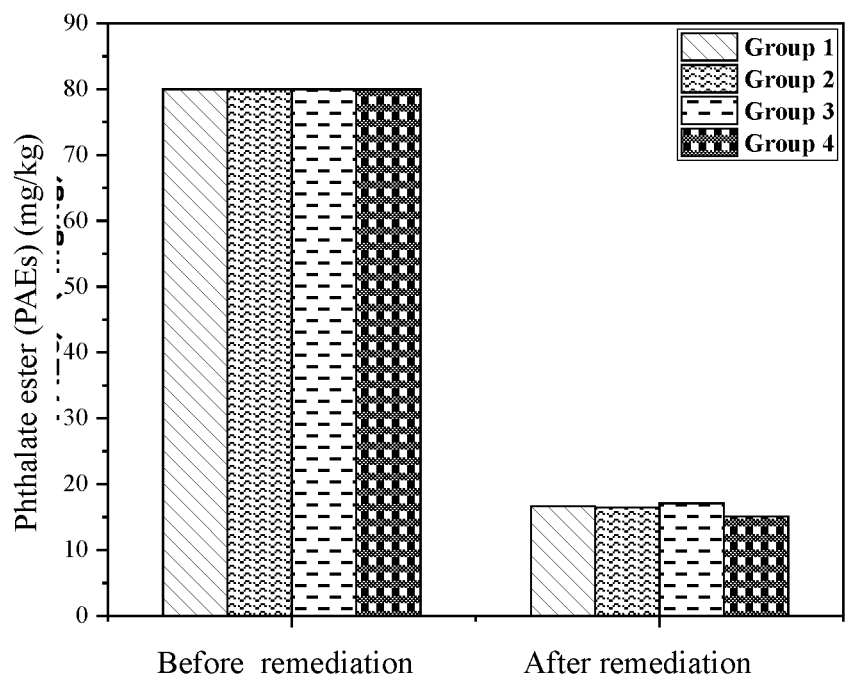
FIG. 7 schematically shows the change in content of PAE in the PAE-contaminated soil after 7 days of remediation according to Example 5 of the present disclosure.

As shown in FIG. 7, the content of PAE in the soil added with manganese-oxidizing bacteria was lower than the soil without adding manganese-oxidizing bacteria. In the presence of sufficient nutrients and inorganic salts, the growth and reproduction of microorganisms could effectively degrade PAEs in the soil, decreasing from 80 mg/kg to 14.04 mg/kg after treatment for 7 days.

Example 6

(1) Provided herein was a separation method of *Pseudomonas* sp, which includes the following steps.
Strain Domestication and Separation A rusty water sample with mixed microbiota was incubated into a nutrient broth medium containing 3.5% NaCl with an inoculation ratio of 2%, followed by enrichment and culturing at 30° C. and 150 r·min$^{-1}$ for 3 days to obtain a bacteria solution. The bacteria solution was then inoculated into a PYCM containing 3.5% NaCl at an inoculation ratio of 2%, followed by culturing for 3 days.
Gradient Dilution The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.
Coating The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.
Plate Streak A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.
Enrichment Culture The pure strain of *Pseudomonas* sp. strain KW-2 was inoculated into an enrichment nutrient broth medium (19 g/L) for enrichment culture to form a remediation stock solution.

The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized. The nutrient broth medium was 0.1 g/L nutrient broth, which had a pH of 7.0±0.2 and was sterilized.

(2) Provided herein was a remediation method for PAE-contaminated soil, which includes the following steps.

A test substance was fed to PAE-contaminated soil, followed by mixing for 30 min and culturing at 30° C. for 15 days, where a feeding amount of the test substance was 20% by weight of the contaminated soil. The bacteria solution was added to the PEA-contaminated soil to induce the bacteria to generate biogenic manganese oxides (BMOs). BMOs converted PAEs into $CO_2$ and $H_2O$ through a series of metabolic pathways, thus achieving the in-situ remediation of PAE-contaminated soil.

Figure 8:
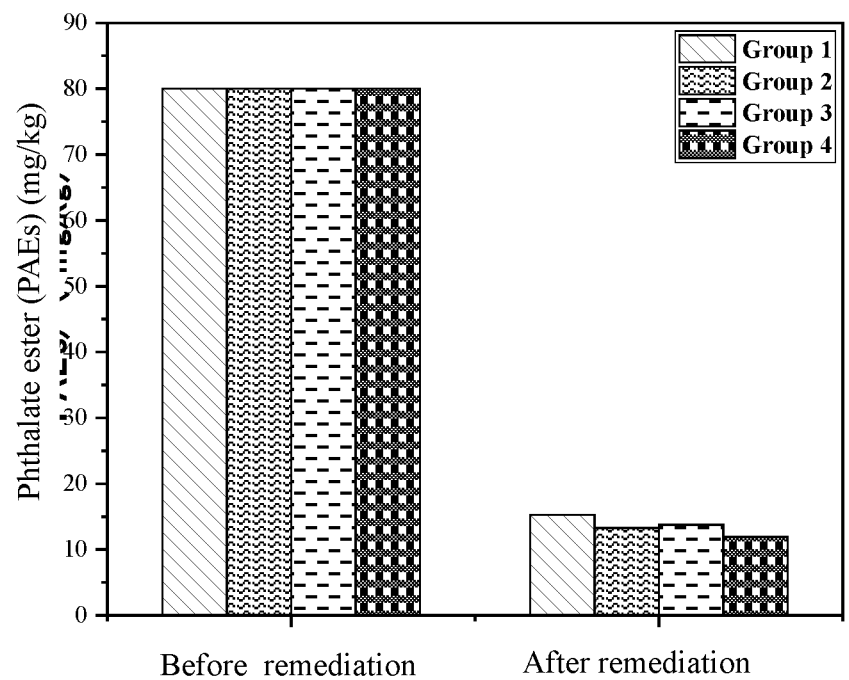
FIG. 8 schematically shows the change in content of PAE in the PAE-contaminated soil after 15 days of remediation according to Example 6 of the present disclosure.

As shown in FIG. 8, the content of PAE in the soil added with manganese-oxidizing bacteria was lower than the soil without adding manganese-oxidizing bacteria. In the presence of sufficient nutrients and inorganic salts, the growth and reproduction of microorganisms could effectively degrade PEA in the soil, decreasing from 80 mg/kg to 11.92 mg/kg after treatment for 15 days.

As could be seen from the above embodiments, by using the remediation method provided in the present disclosure, the PAE-contaminated soil could be remediated. In the remediation method, *Pseudomonas* sp. strain KW-2 was selected and subjected to enrichment culture in an enrichment medium. Then the Mn (II) was brought into the contaminated soil in the form of manganese (IV) oxide through the action of the strain, which reacted with PAEs through adsorption and oxidative decomposition, resulting in increased degradation of PAEs in soil. In general, the remediation method provided herein had the advantages of simple process, short remediation time, easy operation, low treatment cost, large treatment range, and no secondary pollution.

The test substance dosage in Examples 4-6 was shown in Table 2.

TABLE 2

Test substance dosage in Examples 4-6

| | Group 1 | Group 2 | Group 3 | Group 4 |
|---|---|---|---|---|
| Contaminated soil (g) | 450 | 450 | 450 | 450 |
| Test substance | 10-30% Deionized Water | 10-30% PYCM (without Mn) | 10-30% $Mn^{2+}$ solution (100 mg/kg) | Bacteria, PYCM, and $Mn^{2+}$ solution |

10-30% of the well-cultured bacteria mixture 1 was taken out to undergo centrifugation to collect *Pseudomonas* cells. The *Pseudomonas* cells and 100 mg/kg $Mn^{2+}$ solution were added to the PYCM (without Mn), followed by turning over and shaking to form the bacteria mixture 1.

The test substance was added to the arsenic-contaminated soil according to the ratios in Table 2, stirred and mixed for 20-40 minutes, and then cultured at room temperature (15-35° C.) for 15 days. The bacteria solution was added to the contaminated soil to induce the bacteria to generate biogenic manganese oxides, which concerted PAEs into $CO_2$ and $H_2O$ through a series of metabolic pathways, thus achieving the degradation of PAEs in the soil to complete the in-situ remediation of PEA-contaminated soil.

The remediation method for PAE-contaminated soil provided herein had the following the beneficial effects.

(1) Bacteria were not required to be loaded onto a carrier. The whole method was simple to operate and highly adjustable. Mn (II) was brought into the contaminated soil in the form of manganese (IV) oxide through the action of the strain, resulting in increased degradation of PAEs in soil.

(2) The remediation method provided herein had the advantages of simple process, short remediation time, easy operation, low treatment cost, large treatment range, and no secondary pollution.

Example 7

(1) Provided herein was a separation method of *Pseudomonas* sp, which includes the following steps.
Strain Domestication and Separation A rusty water sample with mixed microbiota was incubated into a nutrient broth medium containing 3.5% NaCl with an inoculation ratio of 2%, followed by enrichment and culturing at 30° C. and 150 r·min$^{-1}$ for 3 days to obtain a bacteria solution. The bacteria solution was then inoculated into a PYCM containing 3.5% NaCl at an inoculation ratio of 2%, followed by culturing for 3 days.
Gradient Dilution The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.
Coating The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.
Plate Streak A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.
Enrichment Culture The pure strain of *Pseudomonas* sp. strain KW-2 was inoculated into an enrichment nutrient broth medium (19 g/L) for enrichment culture to form a remediation stock solution.

The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized.

(2) Provided herein was a remediation method for PAE-contaminated soil, which includes the following steps.

TABLE 3

Test substance dosage in Example 7

|  | Group 1 | Group 2 | Group 3 | Group 4 |
|---|---|---|---|---|
| Contaminated soil (g) | 450 | 450 | 450 | 450 |
| Test substance | 20% Deionized Water | 20% PYCM (without Mn) | 20% $Mn^{2+}$ solution (100 mg/kg) | Bacteria, PYCM, and $Mn^{2+}$ solution |

10-30% of the well-cultured bacteria mixture 1 was taken out to undergo centrifugation to collect *Pseudomonas* cells. The *Pseudomonas* cells and 100 mg/kg $Mn^{2+}$ solution were added to the PYCM (without Mn), followed by turning over and shaking to form the bacteria mixture 1.

The test substance was added to the arsenic-PAE-contaminated soil according to the ratios in Table 3, stirred and mixed for 30 minutes, and then cultured at room temperature (30° C.) for 15 days. The bacteria solution was added to the arsenic-PAE-contaminated soil to induce the bacteria to generate biogenic manganese oxides, which reacted with As (III), As (V) and PAEs complete the in-situ remediation of the arsenic-PAE-contaminated soil.

Figure 9:
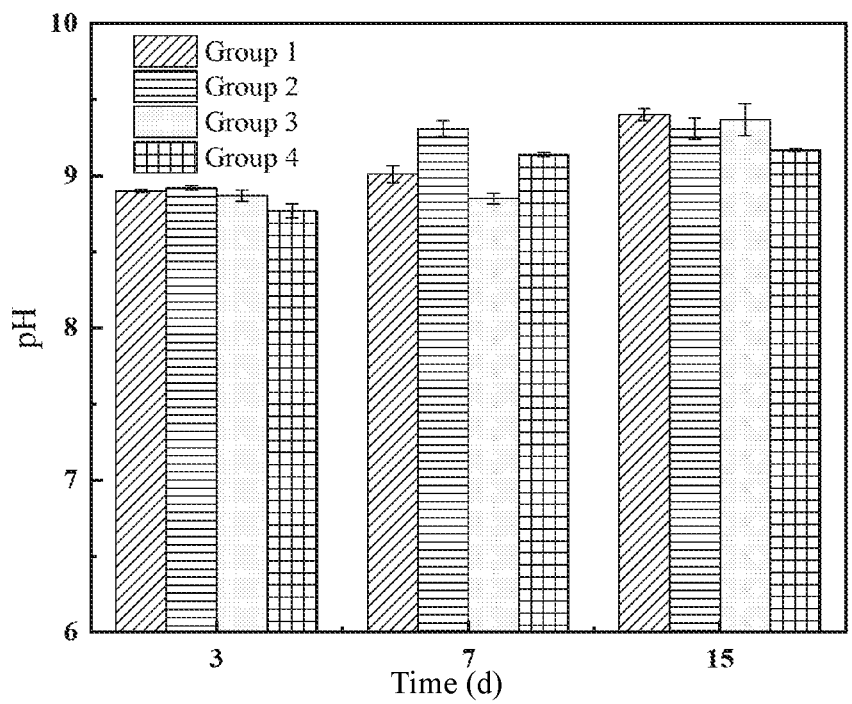
FIG. 9 schematically shows the change in pH of the arsenic-PAE-contaminated soil after remediation according to Example 7 of the present disclosure.

As shown in FIG. 9, by treating for 15 days, the pH of the soil without adding manganese-oxidizing bacteria was higher than the soil added with the manganese-oxidizing bacteria. In the presence of sufficient nutrients and inorganic salts, the growth and multiplication of microorganisms accelerated the rise in pH of the soil in the early stages, but inhibited the salinization of the soil to some extent in the later stages.

Example 8

(1) Provided herein was a separation method of *Pseudomonas* sp, which includes the following steps.
Strain Domestication and Separation A rusty water sample with mixed microbiota was incubated into a nutrient broth medium containing 3.5% NaCl with an inoculation ratio of 2%, followed by enrichment and culturing at 30° C. and 150 r·min$^{-1}$ for 3 days to obtain a bacteria solution. The bacteria solution was then inoculated into a PYCM containing 3.5% NaCl at an inoculation ratio of 2%, followed by culturing for 3 days.
Gradient Dilution The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.
Coating The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.
Plate Streak A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.
Enrichment Culture The pure strain of *Pseudomonas* sp. strain KW-2 was inoculated into an enrichment nutrient broth medium (19 g/L) for enrichment culture to form a remediation stock solution.

The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized.

The nutrient broth medium was 0.1 g/L nutrient broth, which had a pH of 7.0±0.2 and was sterilized.

(2) Provided herein was a remediation method for PAE-contaminated soil, which includes the following steps.

TABLE 4

Test substance dosage in Example 8

|  | Group 1 | Group 2 | Group 3 | Group 4 |
|---|---|---|---|---|
| Contaminated soil (g) | 450 | 450 | 450 | 450 |
| Test substance | 20% Deionized Water | 20% PYCM (without Mn) | 20% $Mn^{2+}$ solution (100 mg/kg) | Bacteria, PYCM, and $Mn^{2+}$ solution |

10-30% of the well-cultured bacteria mixture 1 was taken out to undergo centrifugation to collect *Pseudomonas* cells. The *Pseudomonas* cells and 100 mg/kg $Mn^{2+}$ solution were added to the PYCM (without Mn), followed by turning over and shaking to form the bacteria mixture 1.

The test substance was added to the arsenic-PAE-contaminated soil according to the ratios in Table 4, stirred and mixed for 30 minutes, and then cultured at room temperature (30° C.) for 15 days. The bacteria solution was added to the arsenic-PAE-contaminated soil to induce the bacteria to generate biogenic manganese oxides, which reacted with As (III), As (V) and PAEs complete the in-situ remediation of arsenic pollution in the soil.

Figure 10:
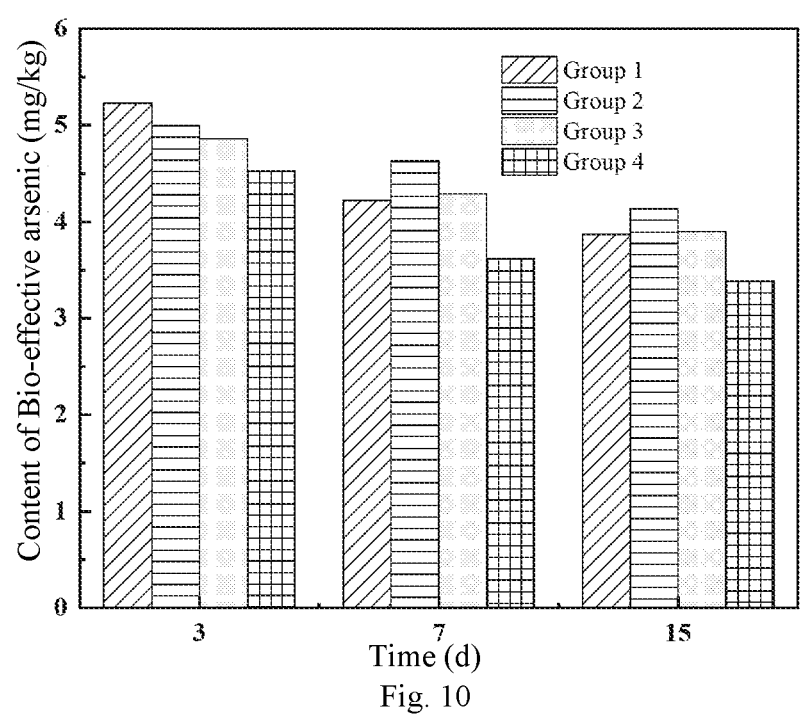
FIG. 10 schematically shows the change in content the bio-effective arsenic in the arsenic-PAE-contaminated soil after remediation according to Example 8 of the present disclosure.

As shown in FIG. 10, the amount of bio-effective As in the soil decreased. Particularly, the amount of bio-effective As in the bacteria-treated group was less than that in the untreated group, decreasing from 4.53 mg/kg to 3.39 mg/kg after treatment for 15 days.

Example 9

(1) Provided herein was a separation method of *Pseudomonas* sp, which includes the following steps.

Strain Domestication and Separation

A rusty water sample with mixed microbiota was incubated into a nutrient broth medium containing 3.5% NaCl with an inoculation ratio of 2%, followed by enrichment and culturing at 30° C. and 150 r·min$^{-1}$ for 3 days to obtain a bacteria solution. The bacteria solution was then inoculated into a PYCM containing 3.5% NaCl at an inoculation ratio of 2%, followed by culturing for 3 days.

Gradient Dilution

The bacterial solution was diluted in a concentration gradient of $10^{-1}$, $10^{-2}$, $10^{-3}$, $10^{-4}$, $10^{-5}$, $10^{-6}$, $10^{-7}$, and $10^{-8}$, respectively.

Coating

The PYCM containing 3.5% NaCl was sterilized, cooled to 60° C. and inverted to form a PYCM solid plate. 0.2 ml each of $10^{-4}$, $10^{-5}$, $10^{-6}$ and $10^{-7}$ dilutions were added dropwise onto the surface of the PYCM solid plate and then spread back and forth with the applicator for about 30 s to render uniform coating. The PYCM solid plate was placed in an incubator for culturing at 30° C. for 3 days to grow single colonies.

Plate Streak

A single colony was selected with an inoculating ring to streak onto a PYCM solid plate containing 3.5% NaCl to repeatedly undergo streak culturing three times to obtain a pure strain with 3 days as one cycle. The pure strain was named as *Pseudomonas* sp. strain KW-2 through lineage identification, and the genealogical development tree was shown in FIG. 2.

Enrichment Culture

The pure strain of *Pseudomonas* sp. strain KW-2 was inoculated into an enrichment nutrient broth medium (19 g/L) for enrichment culture to form a remediation stock solution.

The PYCM included 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate. The PYCM had a pH of 7.0±0.2, and was sterilized.

The nutrient broth medium was 0.1 g/L nutrient broth, which had a pH of 7.0±0.2 and was sterilized.

(2) Provided herein was a remediation method for PAE-contaminated soil, which includes the following steps.

TABLE 5

| | \multicolumn{4}{c|}{Test substance dosage in Example 9} |
|---|---|---|---|---|
| | Group 1 | Group 2 | Group 3 | Group 4 |
| Contaminated soil (g) | 450 | 450 | 450 | 450 |
| Test substance | 20% Deionized Water | 20% PYCM (without Mn) | 20% $Mn^{2+}$ solution (100 mg/kg) | Bacteria, PYCM, and $Mn^{2+}$ solution |

10-30% of the well-cultured bacteria mixture 1 was taken out to undergo centrifugation to collect *Pseudomonas* cells. The *Pseudomonas* cells and 100 mg/kg $Mn^{2+}$ solution were added to the PYCM (without Mn), followed by turning over and shaking to form the bacteria mixture 1.

The test substance was added to the arsenic-PAE-contaminated soil according to the ratios in Table 5, stirred and mixed for 30 minutes, and then cultured at room temperature (30° C.) for 15 days. The bacteria solution was added to the contaminated soil to induce the bacteria to generate biogenic manganese oxides, which reacted with PAEs to complete the in-situ remediation of PEA pollution in the soil.

As shown in FIG. 9, the pH of the soil without adding manganese-oxidizing bacteria was higher than the soil added with the manganese-oxidizing bacteria, because the optimum pH for the manganese-oxidizing bacteria was lower than the optimum pH for other bacteria in the soil, and the growth of the manganese-oxidizing bacteria regulated the pH of the soil, making it more suitable for the growth of the manganese-oxidizing bacteria. Compared with Group 1, Group 4 only increased the removal of phthalate by less than 5%. Therefore, PAEs were probably mainly degraded to $H_2O$ and $CO_2$ by microbial oxidation.

Figure 11:
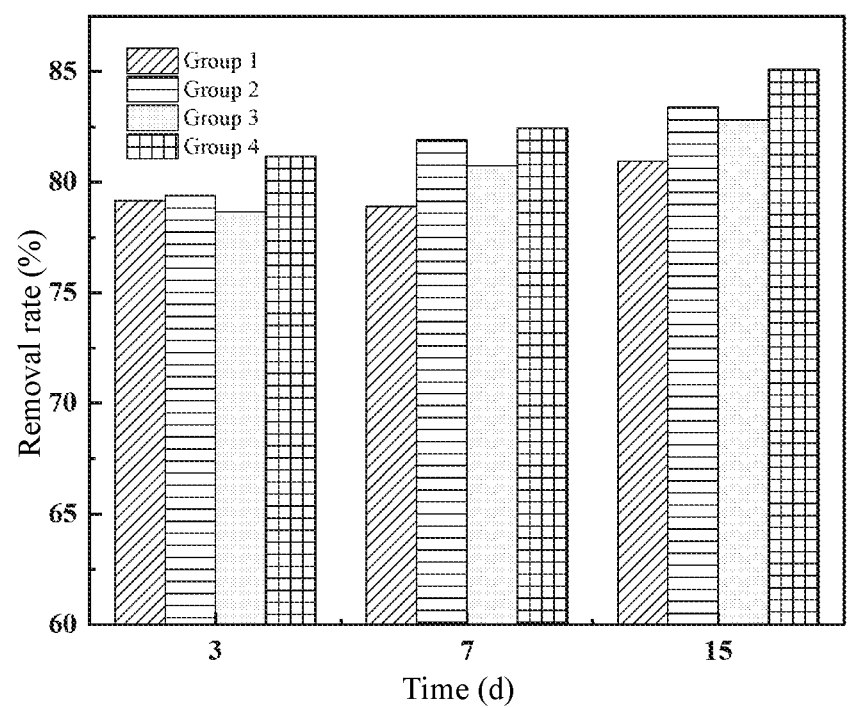
FIG. 11 schematically shows the change in content of PAE in the arsenic-PAE-contaminated soil after remediation according to Example 9 of the present disclosure.

As shown in FIG. 11, after addition of bacteria, the removal of PAEs was better, and the removal rate increased with time, from 81.18% to 85.1%.

Notably, the contaminated soil used herein was saline soil taken from the farmland in Urumqi, Xinjiang. The saline soil had a pH of 8.5-9 and contained 1.5-5% NaCl. Thus, the screening process of the strain of this application was conducted under the salinity of 1.5-5%, which could be applied to saline soil with pH of 8.5-9. FIG. 9 also verified that the remediation method provided herein was effective for contaminated soils with a pH of 8.5-9.

In summary, the remediation method provided herein could remediate the arsenic-PAEs-contaminated soils. In this method, *Pseudomonas* sp. strain KW-2 was selected and cultivated in an enrichment medium. Mn (II) was brought into the contaminated soil in the form of manganese (IV) oxide through the action of the strain, which converted the exchangeable-state arsenic into the residual-state arsenic, reducing the migratory and biological effectiveness of arsenic in the soil, and effectively enhancing the arsenic-remediation effect. Moreover, the manganese-oxidizing bacteria interacted with PAEs through adsorption and oxidative decomposition to degrade PAEs, improving the degradation rate of PAEs in soil. The remediation method had the advantages of simple process, short remediation time, easy operation, low treatment cost, large treatment range, and no secondary pollution.

What is claimed is:

1. An enrichment culture method of *Pseudomonas* sp. strain KW-2, comprising: inoculating the *Pseudomonas* sp.

strain KW-2 into an enrichment nutrient broth medium for enrichment culture to form a remediation stock solution; wherein the *Pseudomonas* sp. strain KW-2 has accession number 29017 with Chinese General Microbiological Culture Collection Center (CGMCC); and the enrichment nutrient broth medium has a pH of 7.0±0.2 and is sterilized before use.

2. A remediation method for contaminated soil, comprising: obtaining the remediation stock solution according to the method of claim 1; centrifuging the remediation stock solution to collect *Pseudomonas* sp. strain KW-2 cells; and resuspending in a Peptone Yeast Citrate Medium (PYCM), followed by shaking to form a remediation bacteria mixture; and applying the remediation bacteria mixture to contaminated soil.

3. The remediation method of claim 2, wherein the amount of the remediation bacteria mixture is 20% by weight of the contaminated soil;
the PYCM comprises 0.8 g/L peptone, 0.2 g/L yeast extract powder, 0.1 g/L dipotassium hydrogen phosphate, 0.2 g/L magnesium sulfate, 0.2 g/L sodium nitrate, 0.1 g/L calcium chloride, 0.1 g/L ammonium chloride, 1 g/L ferric ammonium citrate, 0.2 g/L manganese sulfate, and 0.1 g/L ammonium carbonate; and the PYCM has a pH of 7.0±0.2 and is sterilized; and
an initial pH of the contaminated soil is 8.5-9; and pH change in the contaminated soil is detected every 24 hours during remediation.

4. The remediation method of claim 2, wherein the contaminated soil is arsenic-and-phthalate-contaminated soil, arsenic-contaminated soil, phthalate-contaminated soil or a combination thereof.

* * * * *